(12) United States Patent
Amaike et al.

(10) Patent No.: US 12,071,022 B2
(45) Date of Patent: Aug. 27, 2024

(54) INFORMATION PROCESSING METHOD, INFORMATION PROCESSING DEVICE, AND INFORMATION PROCESSING SYSTEM

(71) Applicant: PANASONIC INTELLECTUAL PROPERTY MANAGEMENT CO., LTD., Osaka (JP)

(72) Inventors: Masaharu Amaike, Osaka (JP); Changhui Yang, Osaka (JP); Takashi Iida, Hyogo (JP); Shinya Nishikawa, Osaka (JP); Takashi Matsuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 291 days.

(21) Appl. No.: 17/762,292

(22) PCT Filed: Jul. 27, 2020

(86) PCT No.: PCT/JP2020/028699
§ 371 (c)(1),
(2) Date: Mar. 21, 2022

(87) PCT Pub. No.: WO2021/070453
PCT Pub. Date: Apr. 15, 2021

(65) Prior Publication Data
US 2022/0355675 A1    Nov. 10, 2022

(30) Foreign Application Priority Data
Oct. 11, 2019    (JP) .................. 2019-187842

(51) Int. Cl.
*B60L 15/20* (2006.01)
*B60L 50/64* (2019.01)
*B60L 58/16* (2019.01)

(52) U.S. Cl.
CPC .............. *B60L 15/20* (2013.01); *B60L 50/64* (2019.02); *B60L 58/16* (2019.02)

(58) Field of Classification Search
CPC .......... B60L 15/20; B60L 50/64; B60L 58/16; B60L 50/60; Y02T 10/72; H01M 10/44; H01M 10/48
See application file for complete search history.

(56) References Cited

U.S. PATENT DOCUMENTS

| | | | |
|---|---|---|---|
| 5,965,991 A | 10/1999 | Koike et al. | |
| 2009/0212626 A1* | 8/2009 | Snyder ................ | B60L 15/209 903/930 |

(Continued)

FOREIGN PATENT DOCUMENTS

| | | |
|---|---|---|
| JP | H08-156653 A | 6/1996 |
| JP | 2011-517924 A | 6/2011 |

(Continued)

OTHER PUBLICATIONS

International Search Report issued on Oct. 13, 2020 in International Patent Application No. PCT/JP2020/028699, with English translation.

*Primary Examiner* — Ig T An
(74) *Attorney, Agent, or Firm* — Rimon P.C.

(57) ABSTRACT

An information processing method executed by a computer includes: acquiring an acceleration request for a mobile body that moves using a battery; calculating an output current in the battery based or the acceleration request; calculating a degradation degree of the battery based on the output current; generating an acceleration control instruction in response to the acceleration request in accordance with the degradation degree of the battery; and outputting the generated acceleration control instruction.

13 Claims, 9 Drawing Sheets

(56) References Cited

U.S. PATENT DOCUMENTS

| | | | | |
|---|---|---|---|---|
| 2015/0188324 A1* | 7/2015 | Nicholson | ......... | H02J 7/007188 |
| | | | | 320/128 |
| 2016/0297318 A1* | 10/2016 | Kirimoto | ................ | B60L 15/20 |
| 2018/0292465 A1* | 10/2018 | Osara | ................. | G01N 33/2888 |
| 2020/0086749 A1* | 3/2020 | Suzuki | .................... | B60L 50/61 |

FOREIGN PATENT DOCUMENTS

| | | |
|---|---|---|
| JP | 2019-022342 A | 2/2019 |
| WO | 2018/155082 A1 | 8/2018 |

* cited by examiner

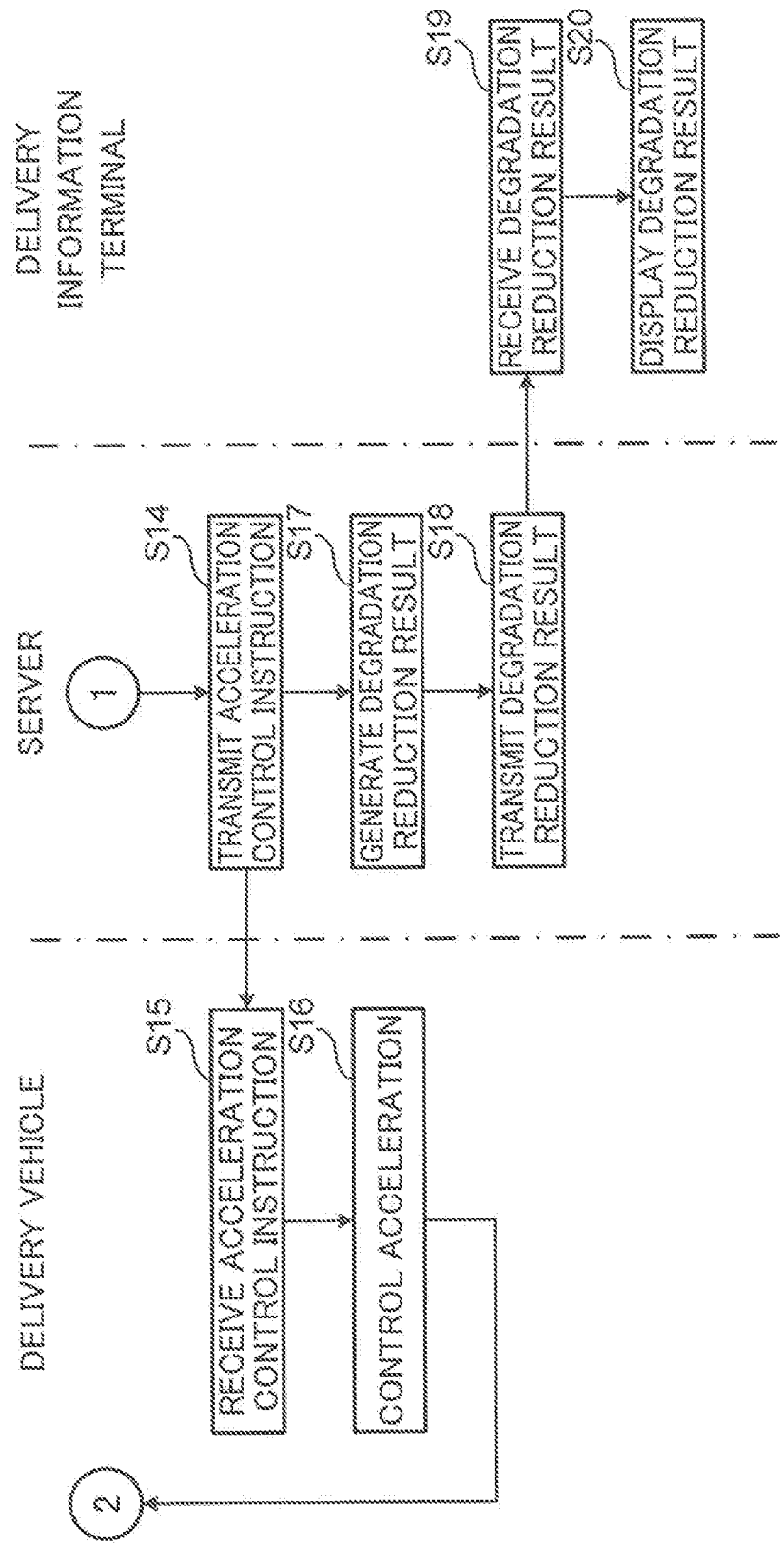

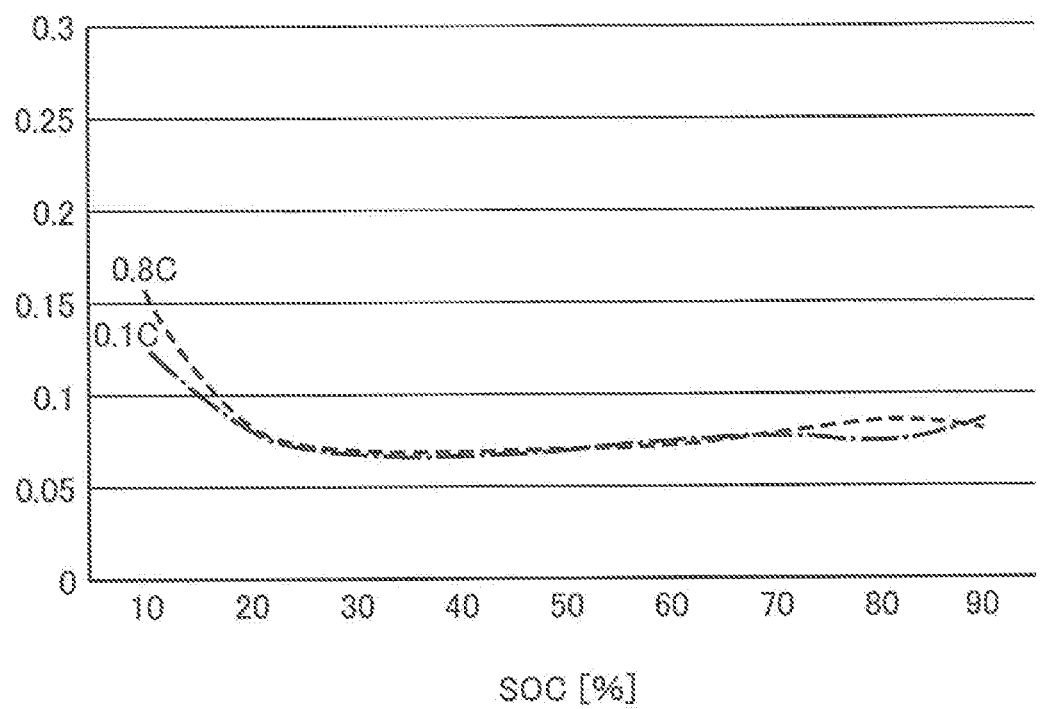

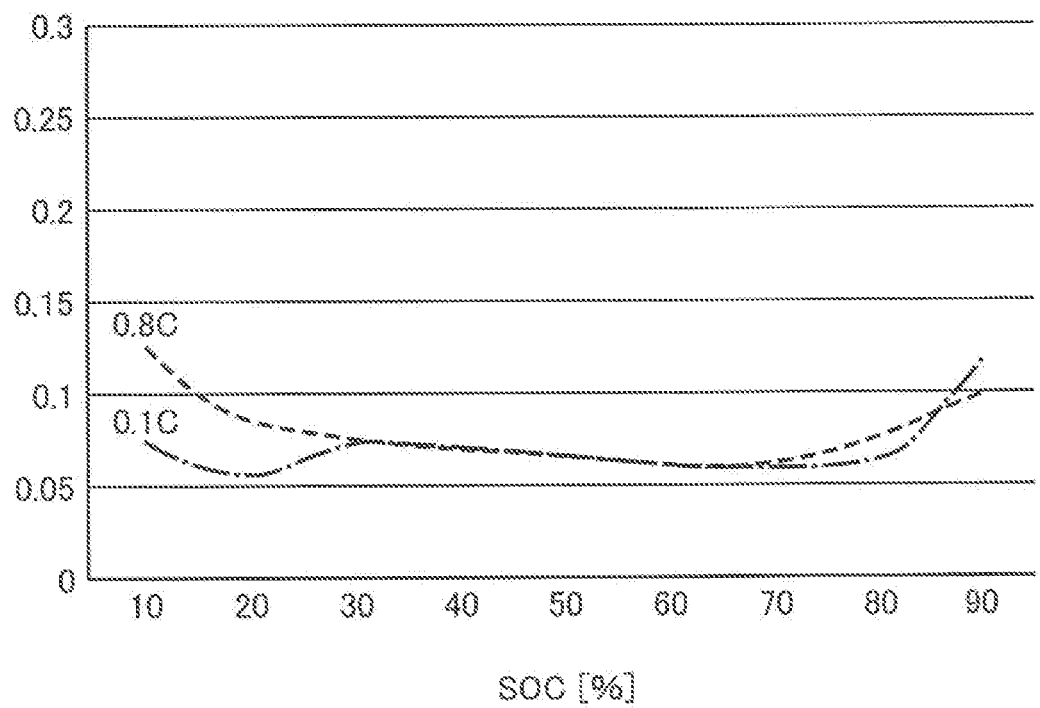

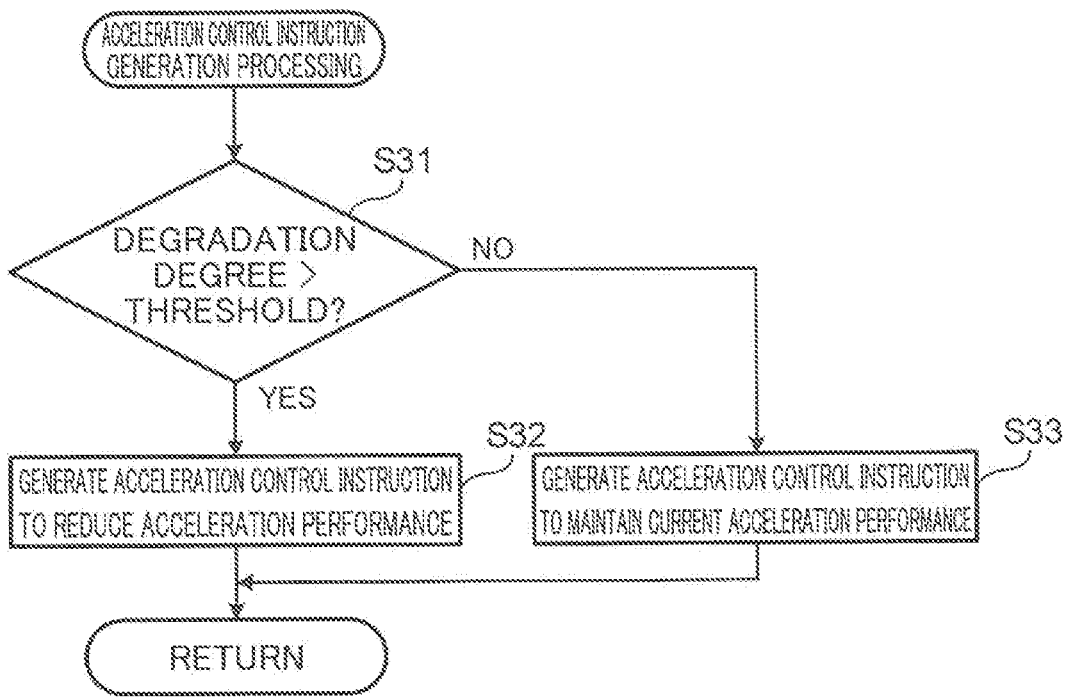

INFORMATION PROCESSING METHOD, INFORMATION PROCESSING DEVICE, AND INFORMATION PROCESSING SYSTEM

CROSS-REFERENCE OF RELATED APPLICATIONS

This application is the U.S. National Phase under 35 U.S.C. § 371 of International Patent Application No. PCT/JP2020/028699, filed on Jul. 27, 2020, which in turn claims the benefit of Japanese Patent Application No. 2019-187842, filed on Oct. 11, 2019, the entire disclosures of which Applications are incorporated by reference herein.

TECHNICAL FIELD

The present disclosure relates to a technique for controlling acceleration of a mobile body using a battery.

BACKGROUND ART

A conventional technique is to controlling acceleration based on a vehicle weight of art electric vehicle in order to reduce power consumption. For example, Patent Literature discloses a control device that calculates a driving torque in accordance with an accelerator opening degree at the time of acceleration of an electric vehicle, compensates the calculated driving torque based on the vehicle weight or the electric vehicle so that acceleration of the electric vehicle reaches a predetermined value, and controls a motor so as to output the compensated driving torque.

However, with the conventional technique, since acceleration performance is improved when the vehicle is heavy, battery degradation of an electric vehicle progresses. This requires further improvement.

CITATION LIST

Patent Literature

Patent Literature JP 2019-22342 A

SUMMARY OF INVENTION

The present disclosure has been made to solve the above problem, and an object or the present disclosure is to provide a technique capable of reducing battery degradation when a mobile body that moves using the battery is accelerated.

An information processing method according to one aspect of the present disclosure is an information processing method executed by a computer, the method including acquiring an acceleration request for a mobile body that moves using a battery, calculating an output current in the battery based on the acceleration request, calculating a degradation degree of the battery based on the output current, generating an acceleration control instruction in response to the acceleration request in accordance with the degradation degree of the battery, and outputting the generated acceleration control instruction.

According to the present disclosure, the degradation of the battery can be reduced when the mobile body that moves using the battery accelerates.

BRIEF DESCRIPTION OF DRAWINGS

FIG. 6 is a second flowchart for describing the degradation reduction processing of the delivery vehicle, the server, and the delivery information terminal according to the embodiment of the present disclosure.

FIG. 7 is a graph illustrating a relationship between a state of charge (SOC) and a discharge cycle degradation rate in the present embodiment.

FIG. 8 is a graph illustrating a relationship between foe SOC and a charge cycle degradation rate in the present embodiment.

FIG. 9 is a flowchart for describing acceleration control instruction generation processing in the present embodiment.

Figure 1:
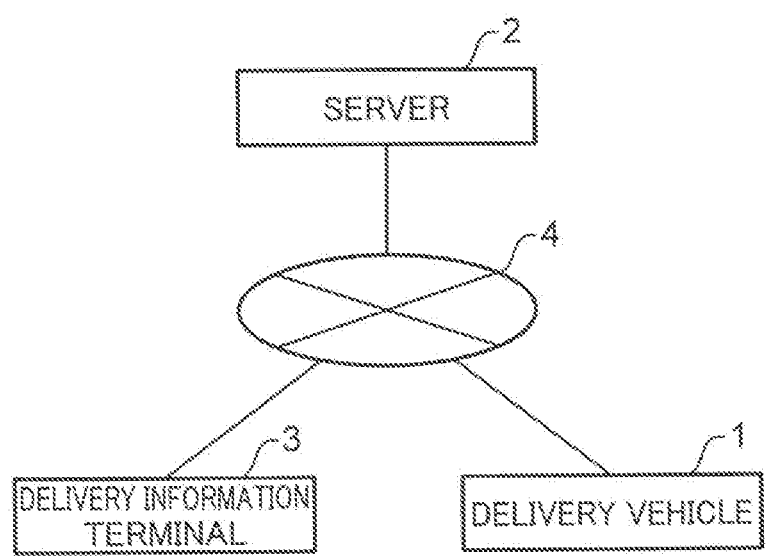
FIG. 1 is a diagram illustrating an entire configuration of an information processing system according to an embodiment of the present disclosure.

DESCRIPTION OF EMBODIMENT (Findings to be Basis of the Present Disclosure)

For example, as characteristics of a lithium ion battery mounted on an electric vehicle, degradation may significantly progress due to large current discharge depending on a state of charge (SOC) of foe battery.

However, in the above-described conventional control device, a priority is given to acceleration performance, and reduction in power consumption is considered, but degradation of a battery is not considered.

In order to solve the above problem, an information processing method according to one aspect of the present disclosure is an information processing method executed by a computer, the method including acquiring an acceleration request for a mobile body that moves using a battery, calculating an output current in the battery based on the acceleration request, calculating a degradation degree of the battery based on foe output current, generating an acceleration control instruction in response to the acceleration request in accordance with tire degradation degree of the battery, and outputting, the generated acceleration control instruction.

According to this configuration, the degradation degree of the battery is calculated based on foe output current calculated in response to the acceleration request for the mobile body that moves using the battery, and the acceleration control instruction in response to the acceleration request is generated in accordance with the degradation degree of the battery. Therefore, when the mobile body that moves using the battery accelerates, the degradation of the battery can be reduced.

Further, with the above information processing method, the acceleration control instruction may include at least one of an instruction to change an acceleration time and an instruction to change a target speed.

According to this configuration, the acceleration control instruction including at least one of the instruction to change the acceleration time and the instruction to change the target speed is output. For example, an increase in the output current is controlled by making the acceleration lime longer than a current acceleration time, and the degradation of the battery can be reduced. Further, for example, the increase in the output current is controlled by making the target speed lower than a current target speed, and the degradation of the battery can be reduced.

Further, with the above information processing method, the target speed may be changed in preference to the acceleration time.

In order to maintain a high speed, a high output, that is, an increase in output current is required, and thus the degradation of the battery might progress. According to the above configuration, since the target speed is changed in preference to the acceleration time, an increase in the output current is controlled as compared with a case where the acceleration time is changed, and degradation of the battery can be reduced.

Further, with the above information processing method, in the generation of the acceleration control instruction, the acceleration control instruction to make the acceleration performance in response to the acceleration request lower as the degradation degree is higher may be generated.

According to tins configuration, since the acceleration control instruction to adjust the acceleration request is generated so as to control the increase in the output current, and thus the discharge current of the battery is controlled within a range in which the degradation is small. This can reduce the degradation of the battery.

Further, with the above information processing method, a requested driving force or a requested motor output may be calculated based on the acceleration request, and in the calculation of the output current, the output current may be calculated based on the requested driving force or the requested motor output.

This configuration enables calculation of an accurate output current in accordance with the requested driving force or foe requested motor output at the time of acceleration.

Further, with the above information processing method, in the calculation of the output current, the output current may be calculated by additionally using a weight of the mobile body and a gradient of a road on which the mobile body moves.

According to this configuration, for example, as the weight of the mobile body increases, the acceleration performance of foe mobile body is reduced, so that an increase in the output current is controlled, and degradation of the battery can be reduced. Further, for example, as the gradient of the road is larger, the acceleration performance of the mobile body is reduced, so that the increase in foe output current is controlled, and degradation of the battery can be reduced.

Further, with the above information processing method, the number of times of generating the acceleration control instruction to make the acceleration performance in response to the acceleration request low may be counted, and the number of generating times may be presented via a presentation device.

This configuration presents the number of times of generating, in response to the acceleration request, the acceleration control instruction to make the acceleration performance low. This can urge a user to perform an operation for reducing the degradation of the battery. In addition, the reduction amount of the degradation of the battery can be quantitatively presented.

Furthermore, with the above information processing method, a degradation reduction amount may be calculated based on the degradation degree, and the degradation reduction amount may be presented via a presentation device.

This configuration presents the degradation reduction amount, and thus urges the user to perform the operation for reducing the degradation of the battery. In addition, the reduction amount of the degradation of the battery can be quantitatively presented.

Further, with the above information processing method, the acceleration control instruction may include at least one of the instruction to change the acceleration time and the instruction to change the target speed, and at least one of the changed acceleration time and the changed target speed may be presented via a presentation device.

This configuration presents at least one of the changed acceleration time and the changed target speed. This can urge the user to perform the operation for reducing the degradation of the batters. In addition, the reduction amount of the degradation of the battery can be quantitatively presented.

Further, with the above information processing method, a generation point of the acceleration request related to the generation of the acceleration control instruction to make the acceleration performance in response to the acceleration request low may be acquired, and the generation point may be presented via a presentation device.

This configuration presents the generation point of the acceleration request related to the generation of the acceleration control instruction to make the acceleration performance in response to the acceleration request low. This can urge a user who passes through the generation point to perform the operation for reducing the degradation of the battery. In addition, the reduction amount of the degradation of the battery can be quantitatively presented.

An information processing device according to another aspect of the present disclosure includes an acquisition unit that acquires an acceleration request for a mobile body that moves using a battery, an output current calculator that calculates an output current in the battery based on the acceleration request, a degradation degree calculator that calculates a degradation degree of the battery based on the output current, a generator that generates an acceleration control instruction in response to the acceleration request in accordance with the degradation degree of the battery, and an output unit that outputs the generated acceleration control instruction.

According to this configuration, the degradation degree of the battery is calculated based on the output current calculated in response to the acceleration request for the mobile body that moves using the battery, and the acceleration control instruction in response to the acceleration request is generated in accordance with the degradation degree of the battery. Therefore, when the mobile body that moves using the battery accelerates, the degradation of the battery can be reduced.

An information processing system according to another aspect of the present disclosure includes an acquisition unit that acquires an acceleration request for a mobile body that moves using a battery, an output current calculator that calculates an output current in live battery based on the acceleration request, a degradation degree calculator that calculates a degradation degree of the battery based on the output current, a generator that generates an acceleration control instruction in response to the acceleration request in accordance with the degradation degree of the battery, and an output unit that outputs the generated acceleration control instruction.

According to this configuration, the degradation degree of the battery is calculated based on the output current calculated in response to the acceleration request for the mobile body that moves using the battery, and the acceleration control instruction in response to the acceleration request is generated in accordance with the degradation degree of the battery. Therefore, when the mobile body that moves using the battery accelerates, the degradation of the battery can be reduced.

A preferred embodiment of the present disclosure will be described below with reference to the accompanying drawings. Note that the following embodiment is an example embodying the present disclosure, and is not intended to limit the technical scope of the present disclosure.

EMBODIMENT

FIG. 1 is a diagram illustrating an entire configuration of an information processing system according to an embodiment of the present disclosure.

The information processing system illustrated in FIG. 1 includes a delivery vehicle 1, a server 2, and a delivery information terminal 3.

The delivery vehicle 1 is an example of a mobile body that moves using a battery. The delivery vehicle 1 includes a loading platform on which a plurality of packages is loaded. The delivery vehicle 1 is, for example, an electric car, an electric truck, or an electric motorcycle, and is moved by supplying electric power charged in a storage battery to an electric motor. The delivery vehicle 1 distributes a plurality of packages. The delivery vehicle 1 is operated by a user (delivery person). In a case where a plurality of packages to be delivered is all loaded, the total weight of the delivery vehicle 1 becomes maximum. In addition, the total weight of the delivery vehicle 1 is reduced every time when the delivery of each package is completed. In this manner, the total weight of the delivery vehicle 1 varies depending on the amount of packages loaded on the delivery vehicle 1. The change in the total weight of the delivery vehicle 1 affects acceleration of the delivery vehicle 1.

The delivery vehicle 1 is communicably connecter to the server 2 via a network 4. The network 4 is, for example, the Internet.

Note that the delivery vehicle 1 may be an automatic driving vehicle.

The server 2 is, for example, a web server. The server 2 receives various information from the delivery vehicle 1 and the delivery information terminal 3, and transmits various information to the delivery vehicle 1 and the delivery information terminal 3. The server 2 calculates a degradation degree of the storage battery mounted on the delivery vehicle 1, based on the information received from the delivery vehicle 1 and the delivery information terminal 3. The server 2 then generates an acceleration control instruction to control acceleration of foe delivery vehicle 1 in accordance with the degradation degree, and outputs the generated acceleration control instruction to the delivery vehicle 1.

The delivery information terminal 3 is, for example, a terminal manufactured for a smartphone, a tablet computer, or a delivery person, and is used by the delivery person. The delivery person carries the delivery information terminal 3 and delivers a plurality of packages in a delivery area assigned in advance. The delivery information terminal 3 stores delivery information related to a plurality of packages to be delivered by the delivery person. The delivery information includes, for example, a package ID for identifying a package, a delivery destination of the package, a delivery time of the package, a weight of the package, and a delivery status indicating whether the delivery of the packages is completed. The delivery information terminal 3 is communicably connected to the server 2 via the network 4.

Figure 2:
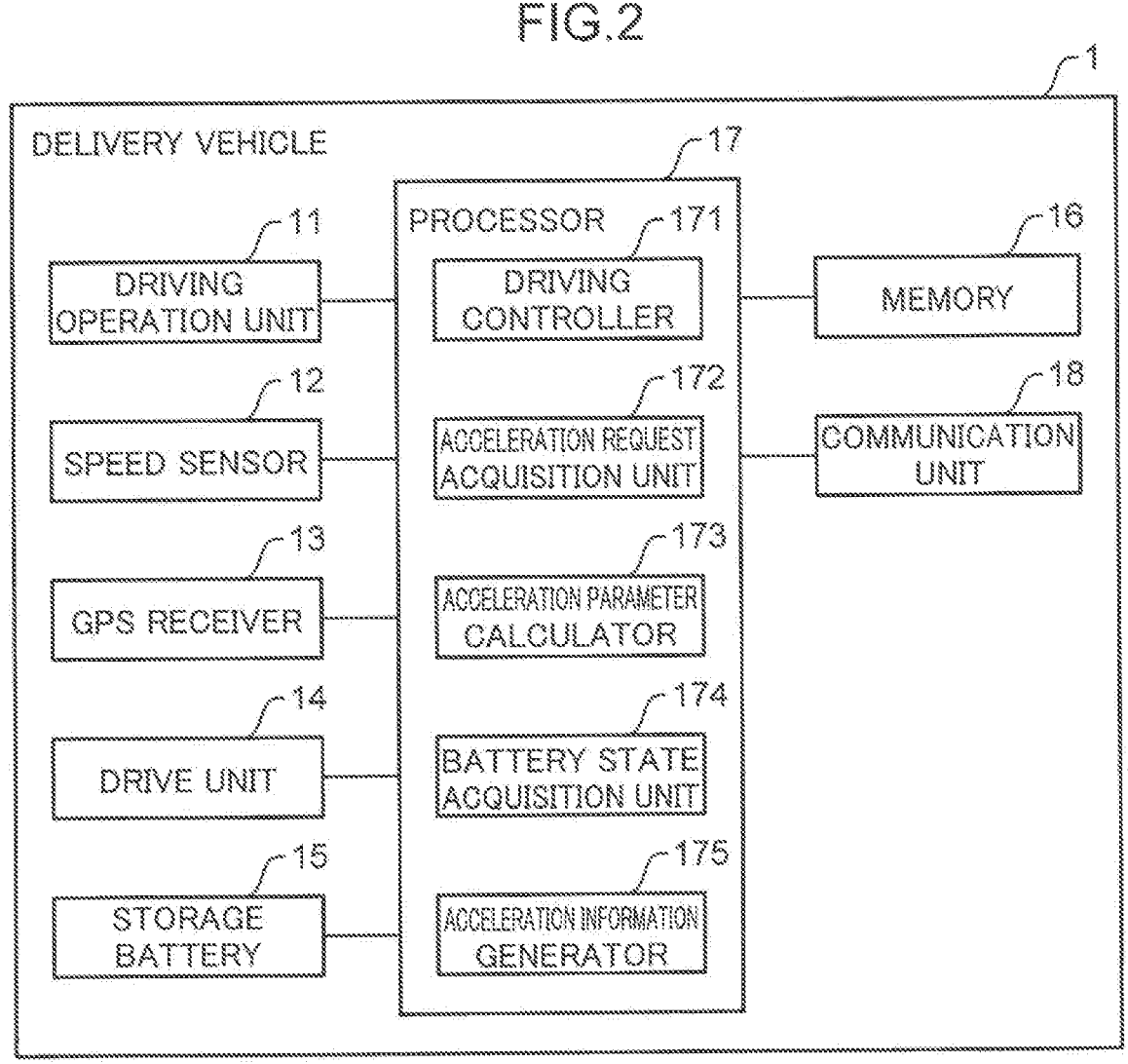
FIG. 2 is a diagram illustrating one example of a configuration of a delivery vehicle according to the embodiment of the present disclosure.

FIG. 2 is a diagram illustrating one example of a configuration of the delivery vehicle according to the embodiment of the present disclosure.

The delivery vehicle 1 illustrated in FIG. 2 includes a driving operation unit 11, a speed sensor 12, a global positioning system (GPS) receiver 13, a drive unit 14, a storage battery 15, a memory 16, a processor 17 and a communication unit 18.

The driving operation unit 11 receives a driving operation of the delivery vehicle 1 performed by the delivery person. The driving operation unit 1 includes, for example, an accelerator pedal. When the accelerator pedal is depressed by the delivery person, the driving operation unit 11 detects a degree of accelerator opening of the accelerator pedal and outputs an acceleration request including the detected degree of accelerator opening to foe processor 17.

The speed sensor 12 acquires a current speed of the delivery vehicle 1.

The GPS receiver 13 acquires the current position of foe delivery vehicle 1. The current position is represented by latitude and longitude.

The drive unit 14 is, for example, an inverter, an electric motor, and a transmission, and moves the delivery vehicle 1 under the control of a driving controller 171.

The storage battery 15 is, for example, a lithium ion secondary battery, and stores power through charging and supplies the power to the drive unit 14 through discharging. The storage battery 15 is an example of the battery.

The memory 16 is a storage device, capable of storing various types of information, such as a random access memory (RAM), a solid state drive (SSD), or a flash memory. The memory 16 stores a vehicle ID for identifying the delivery vehicle 1. Further, the memory 16 stores a total discharge amount including the amount of first discharge through the amount of present discharge of the storage battery 15.

The processor 17 is, for example, a central processing unit (CPU). The processor 17 achieves the driving controller 171, an acceleration request acquisition unit 172, an acceleration parameter calculator 173, a battery state acquisition unit 174, an acceleration information generator 175.

The driving controller 171 causes the drive unit 14 in accordance with the driving operation performed by the delivery person using the driving operation unit 11 to move the delivery vehicle 1.

The acceleration request acquisition unit 172 acquires an acceleration request for the delivery vehicle 1.

The acceleration parameter calculator 173 calculates acceleration parameters including a target speed and an acceleration time until the delivery vehicle 1 reaches the target speed, based on the acceleration request. The acceleration parameter calculator 173 calculates the target speed and the acceleration time in accordance with the degree of accelerator opening.

The battery state acquisition unit 174 acquires the SOC, a state of health (SOH), a temperature, and a total discharge amount of storage battery 15. The SOC of the storage battery 15 is expressed by (remaining capacity [Ah]/full charge capacity [Ah])*100. The SOH of the storage battery 15 is expressed by (remaining capacity [Ah] at the time of degradation/initial full charge capacity [Ah])*100. The temperature of the storage battery 15 is measured by a temperature sensor (not illustrated) provided in the storage battery 15. The discharge amount of the storage battery 15 is measured by a measuring instrument provided in the storage battery 15. The total discharge amount of the storage battery 15 is accumulated in the memory 16. The total discharge amount of the storage battery 15 is acquired from the memory 16. The battery state acquisition unit 174 outputs the SOC, the SOH, the temperature, and the total discharge amount of storage battery 15 as the battery state information to the acceleration information generator) 75.

The acceleration information generator 175 generates acceleration information including the current speed, the acceleration parameters (the target speed and the acceleration time), the current position, the vehicle ID, and the battery state information.

The communication unit 18 transmits the acceleration information generated by the acceleration information generator 175 to the server 2. Further, the communication unit 18 receives the acceleration control instruction transmitted by the server 2. The driving controller 171 controls the drive unit 14 in accordance with the acceleration control instruction received by the communication unit 18.

Figure 3:
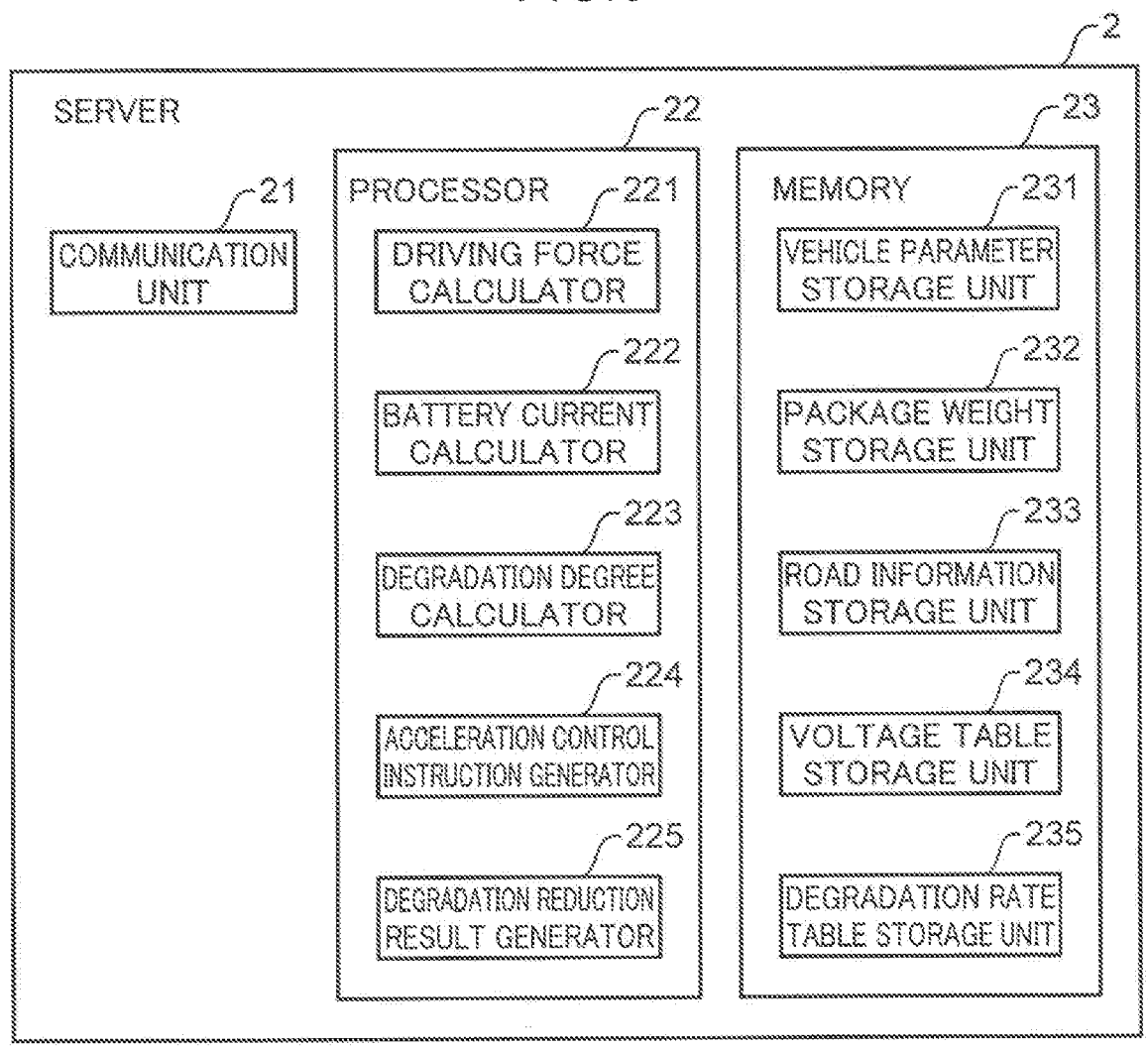
FIG. 3 is a diagram illustrating one example of a configuration of a server according to the embodiment of the present disclosure.

FIG. 3 is a diagram illustrating one example of a configuration of the server according to the embodiment of the present disclosure.

The server 2 illustrated in FIG. 3 includes a communication unit 21, a processor 22, and a memory 23.

The communication unit 21 receives the acceleration information transmitted by the delivery vehicle 1.

The memory 23 is a storage device, capable of storing various types of information, such as a RAM, a hard disk drive (HDD), an SSD, or a flash memory. The memory 23 achieves a vehicle parameter storage unit 231, a package weight storage unit 232, a road information storage unit 233, a voltage table storage unit 234, and a degradation rate table storage unit 235.

The vehicle parameter storage unit 231 stores vehicle parameters unique to the delivery vehicle 1 in advance. The vehicle parameter storage unit 231 stores the vehicle ID and the vehicle parameters in association with each other. The vehicle parameters include the weight of the delivery vehicle 1, a frontal projected area, a rolling resistance coefficient, an air resistance coefficient equivalent value, a motor efficiency, transmission efficiency of a transmission, transmission efficiency of a final speed reducer, a discharge efficiency of the storage battery, and the charge efficiency of the storage battery.

The package weight storage unit 232 stores the total weight of the packages loaded on the delivery vehicle 1. The package weight storage unit 232 stores the vehicle ID of the delivery vehicle 1, package IDs for identifying packages loaded on the delivery vehicle 1, and the weight of the packages in association with each other. Note that the total weight of the packages changes every time when the delivery of each package among the plurality of packages is completed. The communication unit 21 receives the package IDs of the packages that have been delivered from the delivery information terminal 3. Then, the communication unit 21 deletes the package ID and the weight of the package which has been delivered from the package weight storage unit 232.

The road information storage unit 233 stares road information including a gradient angle of a road.

The voltage table storage unit 234 stores a voltage table in which the SOC and the voltage are associated with each other for each SOH and temperature of the storage battery. The voltage table storage unit 234 stores tire voltage table in which the horizontal axis indicates tire SOC and a vertical axis indicates the voltage for each SOH and temperature of the storage battery.

In the present embodiment, the voltage table storage unit 234 stoics the voltage table, but the present disclosure is not particularly limited thereto. The voltage table storage unit 234 may store a relational expression indicating the relationship between the SOC and the voltage for each SOH and temperature of the storage battery.

The degradation rate table storage unit 235 stores a discharge degradation rate table in which the SOC and the discharge cycle degradation rate are associated with each other for each C rate. Further, the degradation rate table storage unit 235 stores a charge degradation rate table in which the SOC and the charge cycle degradation rate are associated with each other for each C rate. The degradation rate table storage unit 235 stores the discharge degradation rate table in which the horizontal axis indicates the SOC and the vertical axis indicates the discharge cycle degradation rate for each C rate. The degradation rate table storage unit 235 stores the charge degradation rate table in which the horizontal axis indicates the SOC and the vertical axis indicates the charge cycle degradation rate for each C rate. Here, a C rate is defined as (an output current)/(a capacity of a storage battery).

In the present embodiment, the degradation rate table storage unit 235 stores the discharge degradation rate table and the charge degradation rate table, but the present disclosure is not particularly limited thereto, and may store a relational expression indicating the relationship between the SOC and the discharge cycle degradation rate for each C rate or a relational expression indicating the relationship between the SOC and the charge cycle degradation rate for each C rate.

The processor 22 is, for example, a CPU. The processor 22 achieves a driving force calculator 221, a battery current calculator 222, a degradation degree calculator 223, an acceleration control instruction generator 224, and a degradation reduction result generator 225.

The driving force calculator 221 calculates a requested driving force based on an acceleration request. Note that the calculation of the requested driving force will be described later.

The battery current calculator 222 calculates an output current in the storage battery 15 based on the acceleration request. The battery current calculator 222 calculates the output current based on the requested driving force calculated by the driving force calculator 221. The battery current calculator 222 calculates the output current additionally using the weight of the delivery vehicle 1 and the gradient angle of the road on which the delivery vehicle 1 moves.

The battery current calculator 222 calculates storage battery driving power consumption based on the requested driving force calculated by the driving force calculator 221 and the vehicle parameters stored in the vehicle parameter storage unit 231. In addition, the battery current calculator 222 extracts a voltage related to the SOC, the SOH, and the temperature included in the acceleration information from the voltage table stored in the voltage table storage unit 234. Battery current calculator 222 then divides the storage battery driving power consumption by the extracted voltage to calculate the output current. Note that the calculation of the output current will be described later.

Note that the storage battery 15 is discharged when the delivery vehicle 1 accelerates and when the delivery vehicle 1 ascends a gradient, but the storage battery 15 is charged by the motor regenerating as an electric generator when the delivery vehicle 1 decelerates and when the delivery vehicle 1 descends the gradient.

The degradation degree calculator 223 calculates the degradation degree of the storage battery 15 based on the output current calculated by the battery current calculator 222. The degradation degree calculator 223 divides the output current by the capacity of the storage battery 15 to calculate the C rate.

At the time of discharge, the degradation degree calculator 223 selects the discharge degradation rate table related to the calculated C rate from the degradation rate table storage unit 235, and extracts a discharge cycle degradation rate related to the SOC from the discharge degradation rate table. The degradation degree calculator 223 calculates the degradation rate using the discharge cycle degradation rate. Basically, when the delivery vehicle 1 accelerates, the storage battery 15 is discharged. Further, at the time of charge, the degradation degree calculator 223 selects the charge degradation rate table related to tire calculated C rate from the degradation rate table storage unit 235, and extracts the charge cycle degradation rate related to the SOC from the charge degradation rate table. The degradation degree calculator 223 calculates the degradation degree using the charge cycle degradation rate. Note that the calculation of the degradation degree will be described later.

The acceleration control instruction generator 224 generates an acceleration control instruction in response to the acceleration request in accordance with the degradation degree of the storage battery 15. The acceleration control instruction includes at least one of the instruction to change an acceleration time and the instruction to change a target speed. The acceleration control instruction generator 224 changes the target speed in preference to the acceleration time. Further, the acceleration control instruction generator 224 generates an acceleration control instruction to make the acceleration performance in response to the acceleration request lower as the degradation degree is higher.

The communication unit 21 outputs the acceleration control instruction generated by the acceleration control instruction generator 224 to the delivery vehicle 1. That is, the communication unit 21 transmits the acceleration control instruction to the delivery vehicle 1.

The degradation reduction result generator 225 generates a degradation reduction result of the storage battery 15. The degradation reduction result generator 225 counts the number of times of generating the acceleration control instruction to make the acceleration performance in response to the acceleration request low, and presents the counted number of times via the delivery information terminal 3. The vehicle parameter storage unit 231 may store, in association with the vehicle ID, an integrated value of the number of times of generating the acceleration control instruction to make the acceleration performance in response to the acceleration request low.

Note that the degradation reduction result generator 225 may calculate the degradation reduction amount based on the degradation degree, and present the calculated degradation reduction amount via the delivery information terminal 3. In this case, the degradation reduction result generator 225 may calculate, as the degradation reduction amount, a value obtained by subtracting the degradation degree after the reduction from the degradation degree before the reduction.

The degradation reduction result generator 225 may present at least one of the changed acceleration time and the changed target speed via the delivery information terminal 3.

Further, the degradation reduction result generator 225 may present at least one of the acceleration time before foe change and foe target speed before the change via the delivery information terminal 3.

Further, the degradation reduction result generator 225 may acquire a generation point of foe acceleration request related to the generation of the acceleration control instruction to make foe acceleration performance in response to the acceleration request low, and present the acquired generation point via the delivery information terminal 3. The generation point is a current position included in the acceleration information.

The communication unit 21 transmits the degradation reduction result generated by foe degradation reduction result generator 225 to the delivery information terminal 3.

Figure 4:
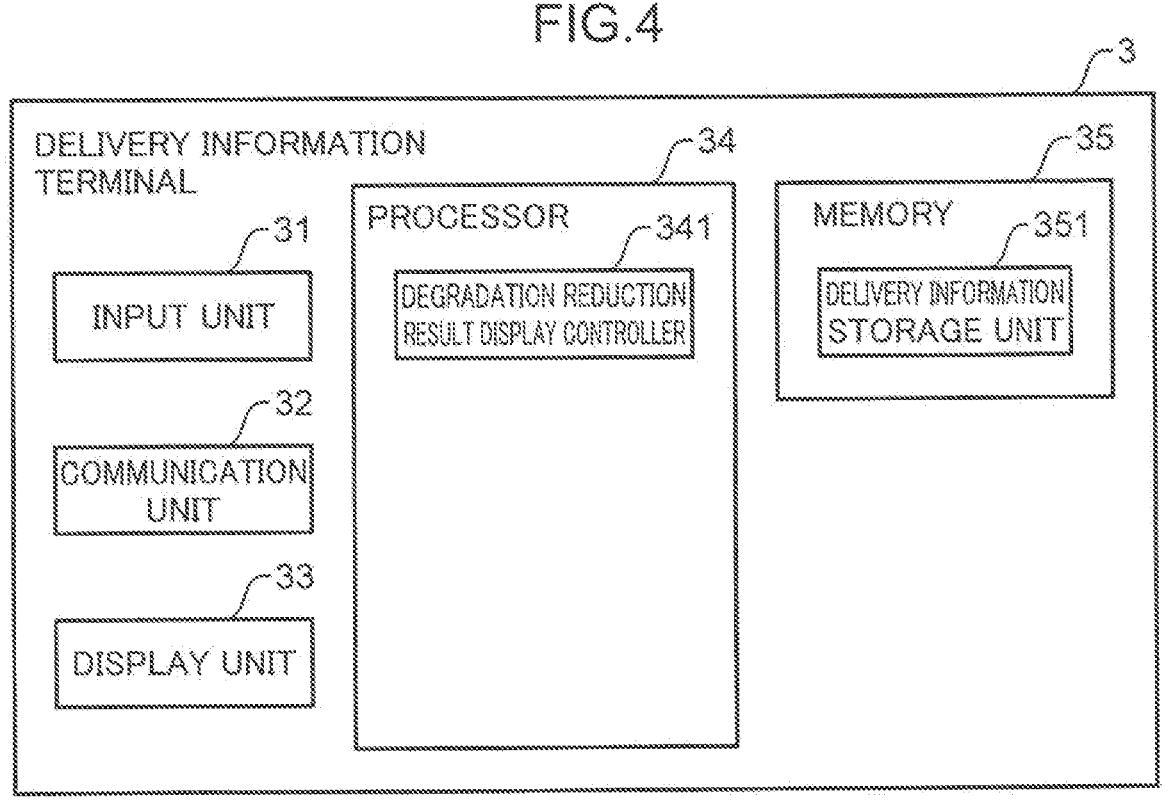
FIG. 4 is a diagram illustrating one example of a configuration of a delivery information terminal according to the embodiment of the present disclosure.

FIG. 4 is a diagram illustrating one example of a configuration of the delivery information terminal according to the embodiment of the present disclosure.

The delivery information terminal 3 illustrated in FIG. 4 includes an input unit 31, a communication unit 32, a display unit 33, a processor 34, and a memory 35.

The input unit 31 is, for example, a touch panel, and receives various types of information input by a user. The input unit 31 receives an input as to whether the delivery of the package has been completed at a delivery destination.

The memory 35 is a storage device, capable of storing various types of information, such as a RAM, an SSD, or a flash memory. The memory 35 achieves the delivery information storage unit 351.

The delivery information storage unit 351 stores delivery information. The delivery information includes, for example, a package ID for identifying a package, a delivery destination of the package, a delivery time of the package, a weight of the package, and a delivery status indicating whether the delivery of the packages is completed. The delivery information storage unit 351 stores delivery information in which a package ID, a delivery destination, a scheduled delivery time, a weight, and a delivery status are associated with each other in a table format.

When the status whether the package delivery is completed is input, the delivery status of the delivery information storage unit 351 is updated. For example, in a case where the delivery of the package to the delivery destination is completed, the delivery status related to the delivery destination in the delivery information storage unit 351 is changed from "undelivered" to "delivery completed". Note that in a case where an addressee is not at the delivery destination, the delivery status in the delivery information storage unit 351 may be changed from "undelivered" to "redeliver".

The communication unit 32 transmits information to the server 2 and receives information from the server 2. The communication unit 32 may receive the delivery information from the server 2 or an external computer, and store the received delivery information in the delivery information storage unit 351. The communication unit 32 may transmit the package ID of the package which has been delivered to the server 2 every time when the delivery of each package is completed. Further, the communication unit 32 receives the degradation reduction result transmitted by the server 2.

The processor 34 is, for example, a CPU. The processor 34 achieves the degradation reduction result display controller 341.

The degradation reduction result display controller 341 causes the display unit 33 to display the degradation reduction result of the storage battery 15 of the delivery vehicle 1. The degradation reduction result display controller 341 causes the display unit 33 to display the degradation reduction result received by the communication unit 32.

The display unit 33 is, for example, a liquid crystal display device, and displays a degradation reduction result.

Degradation reduction processing of the delivery vehicle 1, the server 2, and the delivery information terminal 3 in the embodiment of the present disclosure will be described below.

Figure 5:
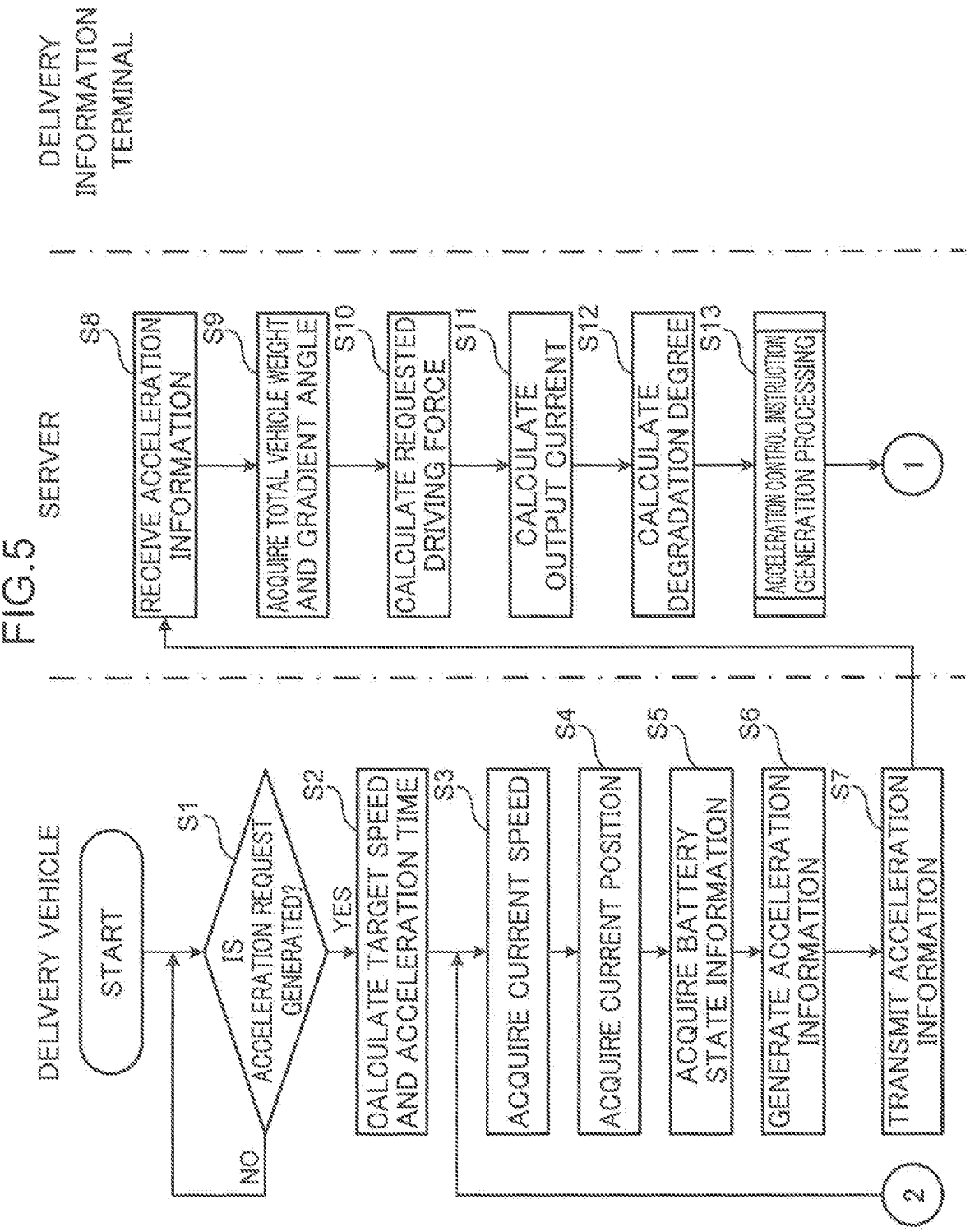
FIG. 5 is a first flowchart for describing degradation reduction processing of the delivery vehicle, the server, and the delivery information terminal according to the embodiment of the present disclosure.

FIG. 5 is a first flowchart for describing the degradation reduction processing of the delivery vehicle, the server, and the delivery information terminal according to the embodiment of the present disclosure. FIG. 6 is a second flowchart for describing the degradation reduction processing of the delivery vehicle, the server, and the delivery information terminal according to the embodiment of the present disclosure.

First, in step S1, the driving controller 171 of the delivery vehicle 1 determines whether an acceleration request has been generated. When an accelerator pedal is depressed by a delivery person, the acceleration request is generated. Here, when the determination is made that the acceleration request is not generated (NO in step S1), the determination processing in step S1 is executed.

On the other hand, when determination is made that the acceleration request is generated (YES in step S1), in step S2, the acceleration parameter calculator 173 calculates a target speed (V2) and an acceleration time (t) based on the acceleration request.

Next, in step S3, the speed sensor 12 acquires the current speed of the delivery vehicle 1.

Next, in step S4, the GPS receiver 13 acquires the current position of the delivery vehicle 1.

Next, in step S5, the battery state acquisition unit 174 acquires battery state information including the SOC, the SOH, the temperature, and the total discharge amount of the storage battery 15. The battery state acquisition unit 174 estimates the SOC, and the SOH based on the current flowing through the storage battery 15, the terminal voltage of the storage battery 15, and the like. Since the SOC and SOH estimation methods are known, the description thereof will be omitted. The battery state acquisition unit 174 acquires the temperature of the storage battery 15 from a temperature sensor (not illustrated) provided in the storage battery 15. Further, the battery state acquisition unit 174 acquires the total discharge amount of storage battery 15 from the memory 16.

Next, in step S6, the acceleration information generator 175 generates acceleration information including the current speed, the target speed, the acceleration time, the current position, the vehicle ID, and the battery state information. Note that the acceleration information generator 175 acquires the vehicle ID from the memory 16.

Next, in step S7, the communication unit 18 transmits the acceleration information generated by the acceleration information generator 175 to the server 2.

Next, in step S8, the communication unit 21 of the server 2 then receives tire acceleration information transmitted by the delivery vehicle 1.

Next, in step S9, the driving force calculator 221 acquires the total vehicle weight and foe gradient angle of the road. The driving force calculator 221 acquires the vehicle weight related to the vehicle ID from the vehicle parameter storage unit 231, and acquires the weights of all the packages associated with the vehicle ID from the package weight storage unit 232. Then, the driving force calculator 221 calculates the total vehicle weight obtained by adding the vehicle weight and the weights of all the packages. Note that the weight of the delivery person is sufficiently light with respect to the sum of the vehicle weight and the weights of all the packages, and thus may not be included in the total vehicle weight. However, in a case where the weight of the delivery person is stored in the vehicle parameter storage unit 231 in advance in association with the vehicle ID, the driving force calculator 221 may add the weight of the delivery person to the total vehicle weight. The driving force calculator 221 may add the weight of a general adult male such as 70 kg to the total vehicle weight as the weight of the delivery person. Further, the driving force calculator 221 acquires the gradient angle of the road corresponding to the current position of the delivery vehicle 1 from the road information storage unit 233.

In the present embodiment, the driving force calculator 221 acquires the gradient angle of the road corresponding to the current position of the delivery vehicle 1 from the road information storage unit 233, but the present disclosure is not particularly limited thereto. The delivery vehicle 1 may include an attitude sensor that detects an inclination angle of the delivery vehicle 1. The server 2 may acquire the inclination angle of the delivery vehicle 1, the inclination angle being detected by the attitude sensor, as the gradient angle of the road.

Next, in step S10, the driving force calculator 221 calculates a requested driving force. The driving force calculator 221 calculates a requested driving force F(N) based on the following Expression (1).

$$F = Rv + Rr + Ra \quad (1)$$

In the above Expression (1), Rv represents gradient resistance (N). Rr represents running resistance (N), and Ra represents acceleration resistance (N). The gradient resistance Rv is expressed by the following expression (2), the running resistance Rr is expressed by the following expression (3), and the acceleration resistance Ra is expressed by the following expression (4).

$$Rv = m*g*\sin \theta \quad (2)$$

$$Rr = ur*m*g + ua*A*V1*V1 \quad (3)$$

$$Ra = (m + mr)*a \quad (4)$$

In the above Expressions (2), (3), and (4), m represents a total vehicle weight (kg), g represents a gravitational acceleration (m/s$^2$). θ represents a gradient angle, ur represents a rolling resistance coefficient, ua represents an air resistance coefficient equivalent value (N/m$^2$/(km/h)$^2$), A represents a frontal projected area (m$^2$), V1 represents a current speed (km/h), mr represents a rotating part equivalent mass (kg), and a represents a current acceleration (m/s$^2$).

The rotating part equivalent mass mr is expressed by m*x, and the coefficient x is a value set in advance for the type of vehicle. The acceleration a is expressed by a(0)=0, a={(V2−V1)*1000/3600}/t. The unit of t is second.

The driving force calculator 221 reads the gravitational acceleration, the rolling resistance coefficient, the air resistance coefficient equivalent value, the frontal projected area, and the coefficient x from the vehicle parameter storage unit 231.

Next, in step S11, the battery current calculator 222 calculates an output current in the storage battery 15. The battery current calculator 222 calculates an output current I based on the following Expression (5).

$$I = P/\text{Volt} \quad (5)$$

In the above Expression (5), P at the time of discharge represents storage battery driving power consumption Pdi, and P at the time of regenerative charge represents storage battery regenerative stored power Pri.

The storage battery driving power consumption Pdi is expressed by the following Expression (6), and the storage battery regenerative stored power Pri is expressed by the following Expression (7).

$$Pdi = Pd/ef\_dischg \quad (6)$$

$$Pri = Pr*ef\_chg \quad (7)$$

In the above Expression (6), Pd represents a discharge output and is expressed by the following Expression (8). In the above Expression (6), ef_dischg represents the discharge efficiency of the storage battery 15. The discharge efficiency is, for example, 0.975.

$$Pd = Pt/ef\_mg/ef\_t/ef\_f \quad (8)$$

In the above Expression (7), Pr represents a regenerative charge output and is expressed by the following Expression (9). In the above Expression (7), ef_chg represents the charge efficiency of the storage battery 15. The charge efficiency is, for example, 0.975.

$$Pr = Pt*ef\_mg*ef\_t*ef\_f \quad (9)$$

In the above of Expressions (8) and (9), Pt represents the drive wheel output and is expressed by the following Expression (10). In the above Expressions (8) and (9), ef_mg represents motor efficiency, ef_t represents the transfer efficiency of the transmission, and ef_f represents transfer efficiency of a final speed reducer. The motor efficiency is, for example, 0.9, the transfer efficiency of the transmission is, for example, 0.95, and the transfer efficiency of the final speed reducer is, for example, 0.95.

$$Pt = F*V1*1000/3600 \quad (10)$$

In the above Expression (10), F represents the requested driving force calculated by the driving force calculator 221 and V1 represents the current speed.

Note that the battery current calculator 222 reads the discharge efficiency, the charge efficiency, the motor efficiency, the transfer efficiency of the transmission, and the transfer efficiency of the final speed reducer from the vehicle parameter storage unit 231.

In the above Expression (5), Volt represents a voltage. The battery current calculator 222 extracts a voltage Volt associated with the SOC, the SOH, and the temperature included in the acceleration information from the voltage table stored in the voltage table storage unit 234.

Next, in step S12, the degradation degree calculator 223 calculates the degradation degree of the storage battery 15 based on the output current calculated by the battery current calculator 222. The degradation degree calculator 223 calculates a degradation degree Deg (%) based on the following Expression (11).

Expression 1.

$$Deg = Deg\_coef * (\sqrt{Total\_Ah + \Delta Ah} - \sqrt{Total\_Ah}) \quad (11)$$

In the above Expression (11), Deg_coef at the time of discharge represents a discharge cycle degradation rate, and Deg_coef at the time of regenerative charge represents a charge cycle degradation rate.

FIG. 7 is a graph illustrating the relationship between the SOC and the discharge cycle degradation rate in the present embodiment. FIG. 8 is a graph illustrating the relationship between the SOC and the charge cycle degradation rate in the present embodiment.

In FIG. 7, the horizontal axis represents the SOC, and the vertical axis represents the discharge cycle degradation rate. Further, in FIG. 8, the horizontal axis represents the SOC and the vertical axis represents the charge cycle degradation rate.

The degradation rate table storage unit 235 stores a discharge degradation rate table in which the SOC (%) and the discharge cycle degradation rate (%/$Ah^{1/2}$) are associated with each other for each C rate. FIG. 7 illustrates the discharge degradation rate table related to the C rates of 0.8 C and 0.1 C. Further the degradation rate table storage unit 235 stores a charge degradation rate table in which the SOC (%) and the charge cycle degradation rate (%/$Ah^{1/2}$) are associated with each other for each C rate. FIG. 8 illustrates the charge degradation rate table related to the C rates of 0.8 C and 0.1 C.

The degradation degree calculator 223 divides the output current I by the capacity of the storage battery 15 to calculate the C rate. At the time of discharge the degradation degree calculator 223 selects the discharge degradation rate table related to the calculated C rate from the degradation rate table storage unit 235. The degradation degree calculator 223 then extracts the discharge cycle degradation rate released to the SOC from the discharge degradation rate table. At the time of charge, the degradation degree calculator 223 selects the charge degradation rate table related to the calculated C rate from the degradation rate table storage unit 235. The degradation degree calculator 223 then extracts the charge cycle degradation rate related to the SOC from the charge degradation rate table. FIGS. 7 and 8 illustrate the discharge degradation rate table and the charge degradation rate table related to the C rates of 0.8 C and 0.1 C, respectively.

Further, in the above Expression (11), represents a total discharge amount, and ΔAh represents a discharge amount required for acceleration. The discharge amount ΔAh is expressed by the following Expression (12).

$$\Delta Ah = I*t \quad (12)$$

In the above Expression (12), I represents the output current calculated to the battery current calculator 222, and t represents the acceleration time.

Returning to FIG. 5, in step S13, the acceleration control instruction generator 224 subsequently performs acceleration control instruction generation processing for generating the acceleration control instruction, based on the degradation degree of the storage battery 15 calculated by the degradation degree calculator 223.

FIG. 9 is a flowchart for describing the acceleration control instruction generation processing in the present embodiment.

First, in step S31, the acceleration control instruction generator 224 determines whether the degradation degree calculated by the degradation degree calculator 223 is larger than a threshold. Here, when the determination is made that the degradation degree is larger than the threshold (YES in step S31), the acceleration control instruction generator 224 generates an acceleration control instruction to reduce the acceleration performance in step S32. More specifically, the acceleration control Instruction generator 224 generates the acceleration control instruction to maintain the current acceleration time and make the to speed lower than the current target speed. Note that the target speed is reduced in a predetermined stepwise manner.

In the present embodiment, the acceleration control Instruction generator 224 may generate an acceleration control instruction to maintain the current target speed and make the acceleration time longer than the cumin acceleration time. Note that the acceleration time is increased in a predetermined stepwise manners. The delivery person may select in advance which of the target speed and the acceleration time is to be changed.

When the determination is made that the degradation degree is larger than the threshold, the acceleration control Instruction generator 224 may first reduce the target speed in a predetermined stepwise manner. Then, when the determined is made that the degradation degree is larger than the threshold after the loop in the processing in steps S3 to S16 is repeated at predetermined times, the acceleration control instruction generator 224 may increase the acceleration time in a predetermined stepwise manner.

Further, the acceleration control instruction generator 224 may generate an acceleration control instruction to make the target speed lower than the current target speed and make the acceleration time longer than the current acceleration time.

On the other hand, when the determination is made that the degradation degree is smaller than or equal to the threshold (NO in step S31), the acceleration control instruction generator 224 generates an acceleration control instruction to maintain the current acceleration performance step S33. More specifically, the acceleration control instruction generator 224 generates an acceleration control instruction to maintain the current target speed and acceleration time.

Returning to FIG. 6, in step S14, the communication unit 21 subsequently outputs the acceleration control instruction generated by the acceleration control instruction generator 224 to the delivery vehicle 1.

Next, in step S15, the communication unit 18 of the delivery vehicle 1 receives the acceleration control instruction transmitted by the server 2.

Next, in step S16, the driving controller 171 controls the acceleration of the delivery vehicle 1 in accordance with the acceleration control instruction received by the communication unit 18. When receiving the acceleration control instruction to maintain the current acceleration time and make the target speed lower than the current target speed, the driving controller 171 calculates a driving torque for maintaining the current acceleration time and making the target speed lower than the current target speed, and outputs the driving torque to the drive unit 14. The drive unit 14 causes the motor to output the drive torque from the driving controller 171. When receiving the acceleration control instruction to maintain the current target speed and acceleration time, the driving controller 171 calculates the drive torque for maintaining the current target speed and acceleration time, and outputs the drive torque to the drive unit 14.

In step S17, the degradation reduction result generator 225 of the server 2 generates a degradation reduction result of the storage battery 15. When the acceleration control instruction generator 224 generates the acceleration control instruction to reduce the acceleration performance, the degradation reduction result generator 225 may read an integrated value within a predetermined period of the number of times of generating the acceleration control instruction to reduce the acceleration performance from the memory 23 and generate the read integrated value as the degradation reduction result. Note that the predetermined period may be, for example, one month, one week, one day, or one time of driving. The predetermined period may be set by the delivery person.

Next, in step S18, the communication unit 21 transmits the degradation reduction result generated by the degradation reduction result generator 225 to the delivery information terminal 3.

Next, in step S19, the communication unit 32 of the delivery information terminal 3 receives the degradation reduction result transmitted by the server 2.

Next, in step S20, the degradation reduction result display controller 341 causes the display unit 33 to display the degradation reduction result of the storage battery 15 received by the communication unit 32. The display unit 33 displays the degradation reduction result under the control of the degradation reduction result display controller 341.

After the processing in step S16 is executed, the processing returns to step S3. Then, the processing in steps S3 to S20 is executed until the current speed reaches the target speed.

In this manner, foe degradation degree of the storage battery 15 is calculated based on the output current calculated in response to the acceleration request of the delivery vehicle 1 that moves using the storage battery 15, and the acceleration control instruction in response to the acceleration request is generated in accordance with the degradation degree of the storage battery 15. Therefore, when the delivery vehicle 1 that moves with the storage battery 15 accelerates, the degradation of the storage battery 15 can be reduced.

In the present embodiment, foe delivery vehicle 1 is an electric car, an electric trunk, or an electric motorcycle, but is not particularly limited thereto in foe present disclosure, and may be an unmanned flying object such as a drone. In this case, the driving force calculator 221 may calculate the requested motor output, and the battery current calculator 222 may calculate the output current based on the requested motor output.

In the present embodiment, the processor 17 of the delivery vehicle 1 may achieve the driving force calculator 221, the battery current calculator 222, the degradation degree calculator 223, the acceleration control instruction, generator 224, and the degradation reduction result generator 225 of the server 2. Further, the memory 16 of the delivery vehicle 1 may achieve the vehicle parameter storage unit 231, the package weight storage unit 232, the road information storage unit 233, the voltage table storage unit 234, and the degradation rate table storage unit 235 of the server 2. In this case, the information processing system includes the delivery vehicle 1 and the delivery information terminal 3, and does not require the server 2.

Further, the delivery vehicle 1 may include the display unit, and in addition to the configuration achieved by tire processor 22 of the server 2, the processor 17 of the delivery vehicle 1 may achieve the degradation reduction result display controller 341 of the delivery information terminal 3. In addition to the configuration achieved by the memory 23 of the server 2, the memory 16 of the delivery vehicle 1 may achieve the delivery information storage unit 351 of the delivery information terminal 3. In this case, the information processing system includes only the delivery vehicle 1, and does not require the server 2 and the delivery information terminal 3.

Although the server 2 generates the degradation reduction result in the present embodiment, the present disclosure is not particularly limited thereto. The server 2 may generate only the acceleration control instruction without generating the degradation reduction result.

Further, the acceleration control instruction may be presented to the user. For example, the acceleration control instruction is presented to the user via the delivery information terminal 3 or the presentation device such as a display unit provided in the delivery vehicle 1. This can urge the user to perform driving that reduces degradation of the battery. Further, the acceleration control instruction may not be output to the delivery vehicle 1 but may be output only to the presentation device.

Note that, in the above embodiment, each component may be configured by dedicated hardware or by executing a software program suitable for each component. Each component may be achieved by a program execution unit such as a CPU or a processor reading and executing a software program recorded in a recording medium such as a hard disk or a semiconductor memory.

Some or all of the functions of the device according to the embodiment of the present disclosure are typically achieved as large scale integration (LSI) that is an integrated circuit. Some or all of the functions may be individually integrated into one chip, or may be integrated into one chip so that some or all of them are included. Further, the circuit integration is not limited to LSI, and may be achieved by a dedicated circuit or a general-purpose processor. A field programmable gate array (FPGA) that can be programmed after manufacturing of the LSI or a reconfigurable processor in which connections and settings of circuit cells inside the LSI can be reconfigured may be used.

Some or all of the functions of the device according to the embodiment of the present disclosure may be achieved by a processor such as a CPU executing a program.

Further, the numbers used above are all illustrated to specifically describe the present disclosure, and the present disclosure is not limited to the illustrated numbers.

The order which each step illustrated in the above flowchart is executed is for specifically describing the present disclosure, and may be an order other than the above as long as a similar effect can be obtained, in addition, same of the above steps may be executed simultaneously (in parallel) with other steps.

INDUSTRIAL APPLICABILITY

The technique of the present disclosure is useful as a technique for controlling acceleration of a mobile body that moves using a battery because degradation of the battery can be reduced when the mobile body that moves using the battery accelerates.

The invention claimed is:

1. An information processing method executed by a computer, the method comprising:
   acquiring an acceleration request for a mobile body that moves using a battery and a state of charge (SOC) of the battery;
   acquiring a current location of the mobile body using a global positioning system;
   calculating an output current in the battery based on the acceleration request and information relating to the current location;
   calculating a degradation rate at a time of discharge or charge of the battery based on the output current and the SOC, and calculating a degradation degree of the battery using the degradation rate;
   generating an acceleration control instruction in response to the acceleration request in accordance with the degradation degree of the battery; and
   outputting the generated acceleration control instruction to the mobile body to control acceleration of the mobile body.

2. The information processing method according to claim 1, wherein the acceleration control instruction includes at least one of an instruction to change an acceleration time and an instruction to change a target speed.

3. The information processing method according to claim 2, wherein the target speed is changed in preference to the acceleration time.

4. The information processing method according to claim 1, wherein in the generation of the acceleration control instruction, the acceleration control instruction to make an acceleration performance in response to the acceleration request lower as the degradation degree is higher is generated.

5. The information processing method according to claim 1, further comprising:
   calculating a requested driving force or a requested motor output based on the acceleration request,
   wherein in the calculation of the output current, the output current is calculated based on the requested driving force or the requested motor output.

6. The information processing method according to claim 5, wherein in the calculation of the output current, the output current is calculated by additionally using a weight of the mobile body.

7. The information processing method according to claim 1, further comprising:
   counting a number of times of generating the acceleration control instruction to make the acceleration performance in response to the acceleration request low; and
   presenting the number of generating times via a presentation device.

8. The information processing method according to claim 1, further comprising:
   calculating a degradation reduction amount based on the degradation degree; and
   presenting the degradation reduction amount via a presentation device.

9. The information processing method according to claim 2,
   wherein the acceleration control instruction includes at least one of the instruction to change the acceleration time and the instruction to change the target speed, the method further comprising:
   presenting at least one of the changed acceleration time and the changed target speed via a presentation device.

10. The information processing method according to claim 1, further comprising:
    acquiring a generation point of the acceleration request related to the generation of the acceleration control instruction to make the acceleration performance in response to the acceleration request low; and
    presenting the generation point via a presentation device.

11. An information processing device comprising:
    an acquisition unit that acquires an acceleration request for a mobile body that moves using a battery and a state of charge (SOC) of the battery;
    a location acquisition unit that acquires a current location of the mobile body using a global positioning system;
    an output current calculator that calculates an output current in the battery based on the acceleration request and information relating to the current location;
    a degradation degree calculator that calculates a degradation rate at a time of discharge or charge of the battery based on the output current and the SOC and calculates a degradation degree of the battery using the degradation rate;

a generator that generates an acceleration control instruction in response to the acceleration request in accordance with the degradation degree of the battery; and an output unit that outputs the generated acceleration control instruction to the mobile body to control acceleration of the mobile body.

12. An information processing system comprising:

an acquisition unit that acquires an acceleration request for a mobile body that moves using a battery and a state of charge (SOC) of the battery;

a location acquisition unit that acquires a current location of the mobile body using a global positioning system;

an output current calculator that calculates an output current in the battery based on the acceleration request and information relating to the current location;

a degradation degree calculator that calculates a degradation rate at a time of discharge or charge of the battery based on the output current and the SOC and calculates a degradation degree of the battery using the degradation rate;

a generator that generates an acceleration control instruction in response to the acceleration request in accordance with the degradation degree of the battery; and an output unit that outputs the generated acceleration control instruction to the mobile body to control acceleration of the mobile body.

13. The information processing method according to claim 5, wherein:

information relating to the current location includes a gradient of a road at the current location of the moving body, and in the calculation of the output current, the output current is calculated by using the gradient of a road on which the mobile body moves.

* * * * *